United States Patent
Kirsten

[19]

[11] Patent Number: 6,102,683

[45] Date of Patent: Aug. 15, 2000

[54] COMPRESSOR INSTALLATION HAVING WATER INJECTION AND A WATER TREATMENT DEVICE

[76] Inventor: Guenter Kirsten, Erzbergerstrasse 13, 08451 Crimmitschau, Germany

[21] Appl. No.: 08/860,321

[22] PCT Filed: Nov. 24, 1995

[86] PCT No.: PCT/EP95/04637

§ 371 Date: Jun. 23, 1997

§ 102(e) Date: Jun. 23, 1997

[87] PCT Pub. No.: WO96/21109

PCT Pub. Date: Jul. 11, 1996

[30] Foreign Application Priority Data

Dec. 29, 1994 [DE] Germany .............................. 44 47 097

[51] Int. Cl.[7] .................................................. F04C 29/04
[52] U.S. Cl. .............................. 418/85; 418/87; 418/89; 418/97; 418/100; 418/DIG. 1; 204/272
[58] Field of Search .................................... 418/1, 85, 89, 418/97, 100, DIG. 1, 87; 210/696; 422/14; 204/272

[56] References Cited

U.S. PATENT DOCUMENTS

| | | | |
|---|---|---|---|
| 4,968,231 | 11/1990 | Zimmern et al. | 418/97 |
| 5,033,944 | 7/1991 | Lassota | 418/89 |
| 5,234,555 | 8/1993 | Ibbott | 204/272 |

FOREIGN PATENT DOCUMENTS

| | | | |
|---|---|---|---|
| 0258255 | 12/1986 | European Pat. Off. | |
| 0389036 | 9/1990 | European Pat. Off. | 418/97 |
| 0467505 | 1/1992 | European Pat. Off. | 204/272 |
| 0499732 | 8/1992 | European Pat. Off. | |

*Primary Examiner*—John J. Vrablik
*Attorney, Agent, or Firm*—Diller, Ramik & Wight, PC

[57] ABSTRACT

The invention relates to a compressor installation (10) with an injection-cooled compressor (12) and a method for compressing a gas in a compressor installation. In order to allow for an environmentally acceptable compression of gaseous media, the compressor system (10) is cooled with oil-free cooling water (25) free of additives. The cooling water injection into the compressor (12) is dosed such that the compression is almost isothermal. Further, a water treatment device (31) for preventing mineral deposits is provided that modifies the cooling water (25) such that the formation of mineral deposits in the cooling circuit is prevented.

10 Claims, 2 Drawing Sheets

COMPRESSOR INSTALLATION HAVING WATER INJECTION AND A WATER TREATMENT DEVICE

BACKGROUND OF THE INVENTION

The invention relates to a compressor installation with an injection-cooled compressor, and a method for compressing a gas in a compressor installation.

Compressors and in particular screw-type compressors are used to compress gaseous media, in particular air sucked in from the atmosphere. Generally, it is intended to provide the gas with a maximum pressure level, at a moderate temperature and free of impurities.

In order to provide the gas at a low temperature at the pressure outlet of a screw-type compressor, different liquid injection pumps have been developed for screw-type compressors. The coolant used for such injection-cooled screw-type compressors is oil, water or a chemical coolant mixture.

It is well known that with screw-type compressors, a low gas outlet temperature is generally coupled to a high efficiency. However, it is no longer tolerable in these days to trade in a good energy efficiency for a strain on the environment by hazardous substances or an excessive consumption of water.

CH-A-564 153 describes a screw-type compressor with a closed pressure cooling circuit in which oil circulates. From CH-A-564 153 it is known that the size of oil droplets and their trajectories have a substantial influence on the cooling effect Further, it is known that a fine atomization of oil droplets provides for good cooling, yet very small oil droplets make it difficult to separate the oil later on and will cause impurities in the pressure gas. The lubricant oil meant for lubrication and cooling is injected into the screw-type compressor and limits the heat-up of the gas to be compressed. Together with the compressed gas, it is led off into a precipitation vessel where the lubricant oil carried along in the pressure gas will precipitate. From the precipitation vessel, the pressure gas is led out of the compressor installation via a cooling means. The lubricant oil is returned to the compressor via a coolant conduit and an oil cooling means and it is again mixed with the gas to be compressed in the compressor. This document does address the suitability of water, yet offers no concrete hint as to a corresponding embodiment.

Using oil as the coolant and lubricant means a burden to the environment since it is impossible to clear all of the lubricant oil from the pressure gas. Moreover, such a screw-type compressor installation cannot be used in applications where a pressure gas entirely free of oil is necessary.

EP-B-0 389 036, DE-A-40 42 177 and EP-B-0 258 255 disclose concrete examples for using water as the coolant liquid. Using water as the coolant allows to avoid unfavorable impurities in the pressure gas. The presence of water itself in the pressure gas poses no problems for most applications, in particular when the pressure gas is air sucked in from the atmosphere and compressed in the compressor.

Generally, generating pressure gas goes together with a high consumption of energy. For this reason, efforts were made to reduce the energy consumption of generating pressure gas by influencing the march of temperature inside the screw-type compressor.

In the screw-type compressor of EP-B-0 389 036, the fluid is injected directly into the compressor housing in an effort to lower the energy consumption when generating pressure gas. A part of the cooling water to be injected is injected into the take-in side of the compressor, while the major part of the cooling water is injected into the compression space of the screw-type compressor at various locations with respect to the pressure increase.

According to DE-A-40 42 177, the temperature in the working chamber is intended to be reduced by providing atomizer nozzles that produce a fine atomized mist Further, these atomizer nozzles are supposed to effect a more uniform march of temperature in the working chamber.

The energy consumption of a screw-type compressor is substantially determined by the number of rotations of the rotors. The acceleration of the pressure gas particles during compression, which is a finction of the number of rotations, is an important factor for the braking of the rotors and, thus, for the energy consumption of a screw-type compressor. Moreover, the number of rotations of the rotors influences the friction of the bearings and the mutual friction of the rotors. Lower speeds allow for a reduction of the losses that are a function of the rotational speeds. On the other hand, leaks between the rotors and between the rotors and the compressor housing will have particularly negative effects with low speeds, since backflow losses prevent obtaining the intended pressure level and high rates of pressure gas.

In order to minimize such backflow losses, EP-B-0 258 255 suggests to produce a film on the rotors and the inner wall of the housing by injecting water. To this end, a quantity of water is supposed to be injected that is about four times greater than the quantity necessary for a complete saturation of the pressure gas. The cooling water is to be injected into the take-in channel or into the compressor housing. During compression, the gas to be compressed will heat up and a part of the injected water is vaporized in the process. The water not vaporized seals the rotors of the compressor and the housing against each other. Nevertheless, the rotors are intended to rotate at tip circle speeds corresponding to those of dry-running rotors.

Together with the compressed gas, also the cooling water is led out from the screw-type compressor. The mixture of gas and cooling water is led via a cooling means to a separator where gas and liquid cooling water are separated. The separated cooling water is led to a pressureless reservoir from where it may again be fed to the screw-type compressor by means of a pump. However, only a part of the injected water is regained. When the water injection is set to a minimum value, there is no return of water at all and the entire quantity of water needed is supplied from fresh water sources.

U.S. Pat. No. 4,968,231 describes a compressor installation with a closed pressure coolant circuit in which an aqueous solution of potassium borate circulates for lubrication and cooling. Downstream of the compressor, a settling vessel is arranged in the coolant circuit, the vessel being a pressure container that is connected with the outlet of the compressor in a pressure-tight manner. The pressure prevailing in the pressure container urges the borate solution circulating in the compressor installation towards the compressor via a filter and a cooling means. The borate solution injected into the compressor is heated by the compressed gas and reaches the settling vessel together with the pressure gas also heated up. Again, also the compressor installation known from U.S. Pat. No. 4,968,231 is harmful to the environment, by releasing borate and by high energy consumption.

Some known screw-type compressors featuring the injection of liquid into the compressor housing have already attained a favorable level with regard to the energy consumption. Yet, as before, atomizing the coolant is difficult since the evaporation of water causes mineral deposits inside the compressor, which cause large tolerances and, in the course, large gaps as well as deteriorated efficiency.

SUMMARY OF THE INVENTION

It is the object of the present invention to allow for an environmentally acceptable compression of gaseous media.

The compressor installation of the present invention is designed such that cooling water free of oil and lubricants can circulate in the circulation circuit formed by the compressor, the connecting line, the settling vessel and the cooling liquid line. By using water as the coolant, a compressor installation is provided that releases neither oil nor water additives into the environment. However, water is a poor sealant Thus, the water-injection compressor of the present invention requires much narrower sealing gaps than an oil-injection compressor does. This results in much stricter tolerances to be observed. The water treatment device for preventing mineral deposits and the almost isothermal compression prevent deposits from clogging the sealing gaps and from resulting in damages. By avoiding deposits on the bearings, the life-time of the compressor is increased as well.

Thus, the invention is a combination of several measures. First, the environment is protected by not using oil or other additives for lubricating or cooling the compressor installation, this effect not being traded in for a loss in efficiency of the compressor installation. Providing the compressor installation with a closed cooling water circuit and a water treatment device for preventing mineral deposits, as well as designing the compressor installation for almost isothermal compression, internal losses in the compressor installation are minimized. The water treatment device that can only prevent mineral deposits in cooperation with the closed circuit and the low water consumption by the almost isothermal compression, allows for strict tolerances in the rotor design. These strict tolerances in the rotor design reduce backflow losses and thereby improve the efficiency without the need for a particular lubricant or sealant Avoiding mineral deposits is an important feature for allowing strict tolerances. Since the compressor installation of the present invention can work with a low rotational speed, losses and wear are minimized. Besides the low water consumption, the almost isothermal compression also has the positive effect of presenting less resistance to the rotor, since the resistance in the compressor caused by an increase in temperature is reduced. An almost isothermal compression means a compression in which the gas outlet temperature is above or below the gas inlet temperature by less than 5°–10°. Preferably, the gas outlet temperature is less or equal to the gas inlet temperature. Thus, the invention not only consists in omitting additives in the cooling water, but in a well tuned system of measures which leads to a reduced strain on the environment.

The water treatment device has the further advantage of preventing a germination of the circulating cooling water so that environmental hazards due to an uncontrolled spreading of germs is excluded as well.

Using water as the coolant and treating the same is also advantageous in that the generated pressure gas is absolutely free of oil and germs so that the compressor installation may even be used in the field of food industries and in clean-air laboratories.

The compressor installation may be seen as a quasi closed system allowing for an operation with a closed circuit. When the gas to be compressed, air, for example, is fed with a quantity of humidity with which the pressure air also leaves the compressor installation, the cooling water quantity remains constant and the circulation circuit can be operated shut off against the outside. However, the circulation circuit is open to the outside via the gas to be compressed so that the system can only be called quasi closed. In order to compensate for liquid brought in by the gas, the circulation circuit may be open, i.e., it may have a drain. Preferably, the cooling water injection is designed such that no vaporizing is effected in the compressor so that no cooling water is consumed. A feed line may be provided for the initial filling and for maintenance purposes.

Preferably, the water treatment device is a polarization means electrically charging foreign matter transported in the cooling water. Foreign matter, e.g., dissolved minerals, will exchange a free electron under the influence of the electric field existing between the electrodes of the polarization means. Due to the unidirectional charge, the foreign matter particles will repel each other so that the formation of clusters that would foster deposits is prevented. By preventing the formation of mineral deposits, e.g., lime deposits, the life-time of all device components, in particular that of the rotors and the bearings of the same, is increased.

The water treatment device of the compressor installation may have two electrodes of the non-sacrificed type supplied with an external voltage. It is preferred, however, to have a compressor installation wherein the polarization means comprises an electro-chemical element. The electro-chemical element used comprises a positive electrode and a negative electrode between which the cooling water flows as the electrolyte. The foreign matter in the cooling water serve as charge carriers. Such a water treatment device has the advantage of being operative even without current supply. It simplifies the compressor installation and prevents unnecessary power consumption.

Preferably, the polarization means is arranged in a pipe axially flown through, at the inner wall of which a metal electrode is provided cooperating with a counter electrode extending inside the pipe. With such a design of the water treatment device, only little resistance is presented to the flowing cooling water so that little energy is required for conveying the cooling water. At the same time, this design provides for a good polarization of the foreign matter transported in the cooling water. A particularly good polarization is obtained when the metal electrode is of aluminum and the counter electrode is of carbon. With this combination of materials it is guaranteed that only negligible amounts of the electrode material of the dissolving electrode will be dissolved into the cooling water. Particular advantages will further be obtained, if the pipe axially flown through is a steel pipe having its inner wall provided with an insulation electrically insulating the steel pipe from the metal electrode.

Using a particulate filter, preferably a membrane filter, arranged downstream of the polarization means, impurities may be filtered from the cooling water.

The compressor installation may be connected to the public drinking water net via a level-controlled valve. Since the compressor installation functions without oil and lubricants, excess water eventually carried in with the gas to be compressed can be drained off. Such an introduction of water will most often occur in summer when the air to be compressed has a high humidity, since in isothermal compression, the temperature will fall below the pressure dew point. Again, the system can be operated with little monitoring effort, since upper level sensors cause the drain valve to open when too much condensation water has gathered. Oil separators, which require a lot of maintenance work, for separating oil and condensation water can be dispensed with in the compressor installation of the invention.

Further advantages will become evident from the subclaims and the drawings taken in conjunction with the specification. The following is a detailed description of a preferred embodiment illustrated in the drawings, in which:

DESCRIPTION OF THE PREFERRED EMBODIMENTS

Figure 1:
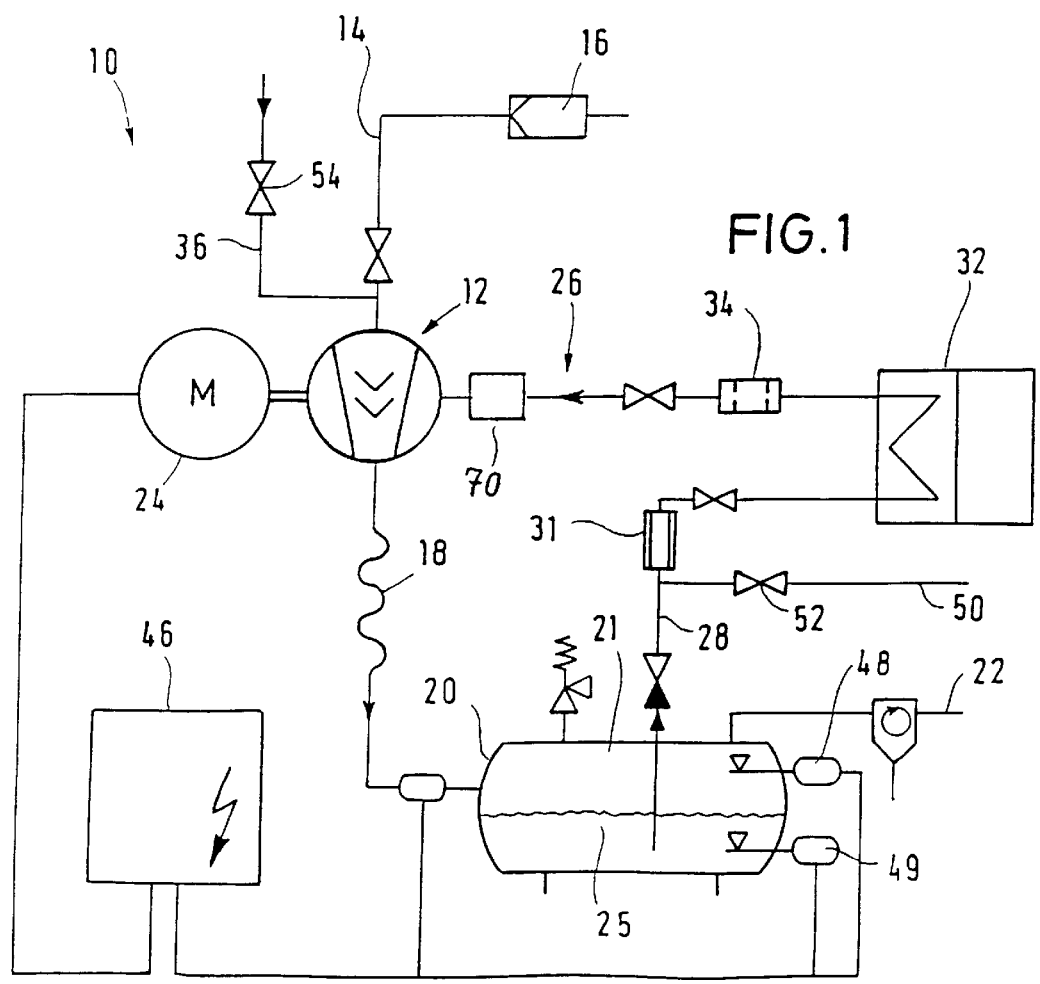
FIG. 1 illustrates a preferred embodiment of the compressor installation with a water treatment device coupled in the cooling water circuit.

FIG. 1 is an illustration of a compressor installation 10 for generating oil-free pressure air. The compressor installation 10 includes a compressor 12, the take-in side of which is connected to an air filter 16 via a gas take-in duct 14. The air compressed inside the compressor 12 is led into a precipitation or settling vessel 20 via a connecting conduit 18 which vessel simultaneously serves as the pressure gas container for the pressure air 21. The pressure air can be taken from the system via a pressure air conduit 22.

The compressor 12 driven by an electromotor 24 is a screw-type compressor with a primary rotor and an secondary rotor made of ceramic material. The primary rotor has five bi-convex teeth helically wound about the axis of the primary rotor and presenting an angle of wrap of about 240° in the pressure part of the compressor 12. The secondary rotor has six convex-concave teeth helically wound about the axis of the secondary rotor. When the rotors mesh, the teeth of the primary and the secondary rotors roll on each other.

Both rotors of the pair of rotors are supported in bearings on both sides, respectively. The primary rotor driving the secondary rotor by meshing therewith is itself driven by a drive shaft.

Both rotors of the rotor pair used in the screw-type compressor 12 are rotors molded from ceramic or plastic material and having a very smooth surface and very strict tolerances. These strict tolerances are achieved by fine treatment, e.g. by lapping and varnishing.

Figure 3:
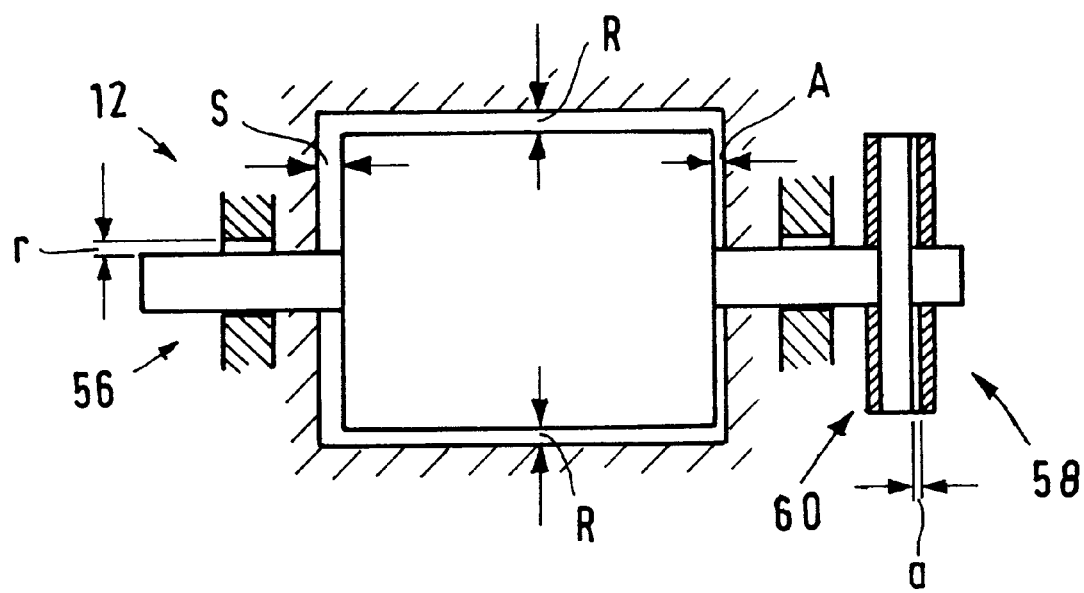
FIG. 3 is a schematic longitudinal section of a screw-type compressor for use in a compressor installation of FIG. 1.
Figure 4:
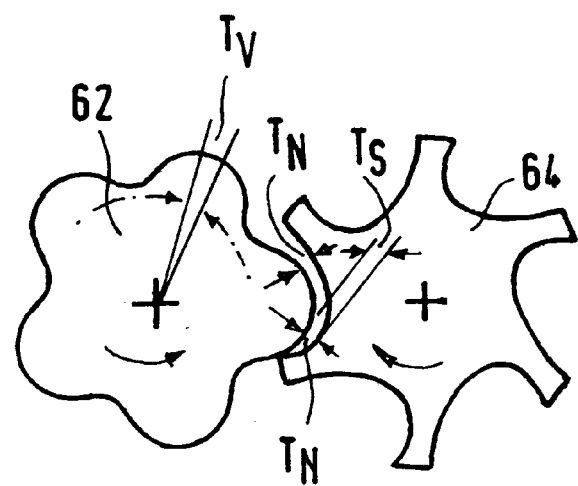
FIG. 4 is a schematic section of a pair of rotors of the screw-type compressor of FIG. 3, seen in a direction transversal to the rotor axes.

The following table 1, in combination with FIGS. 3 and 4, shows tolerances with which a good efficiency may be obtained, the following terms being used in FIGS. 3 and 4:

| S | Take-in side clearance |
| A | Pressure side clearance |
| R | Cylinder clearance |
| r | Radial bearing clearance |

| a | Axial bearing clearance |
| Ts | Transverse overhead clearance |
| Tv | Circumferential flank clearance perpendicular to the rotor axis in the area of the reference circle |
| Tn | Normal clearance perpendicular to the profile flank in the area of the reference circle |

The screw-type compressor 12, schematically shown in FIG. 3 in which the take-in side 56 is illustrated on the left hand side and the pressure side 58 of which can be identified by the thrust bearing 60, has the following tolerances depending on the rotor diameter of a respective series:

TABLE 1

| | Rotor diameter of the rotor | 72 mm | 200 mm | 400 mm |
|---|---|---|---|---|
| S | Take-in side clearance | 20–25 (23–33) | 30–35 (37–47) | 35–40 (55–73) |
| A | Pressure side clearance | 0 (2 ± 1) | 0 (3 ± 1) | 0 (5 ± 1) |
| R | Cylinder clearance | 0–2 (4–6) | 2–4 (7–11) | 2–4 (12–15) |
| Ts | Overhead clearance | 0–1 (1–2) | 1–2 (2–3) | 2–3 (3–6) |
| Tv | Circumferential flank cl. | 0–1 (2–4) | 0–1 (3–5) | 0–1 (4–6) |
| Tn | Normal clearance | 0–1 (1–2) | 0–1 (2–4) | 0–1 (3–5) |
| r | Radial bearing clearance | 0 (1–2) | 0 (3–4) | 0 (4–5) |
| a | Axial bearing clearance | 0 (1–2) | 0 (6–11) | 0 (9–14) |

The tolerance values are given in 1/100 mm, the values for Ts, Tv and Tn referring to reference center distance. For comparison, the tolerances for a known compressor are indicated in brackets. The overhead clearance Ts, the circumferential flank clearance Tv and the normal clearance Tn are shown in FIG. 4, the primary rotor 62 driving the secondary rotor 64 meshing therewith.

Preferably, the rotors are fabricated in accordance with the methods described in DE-A-39 03 067 or DE-A-40 35 534.

In order to allow for a compression where the gas outlet temperature is equal to the gas inlet temperature, or less, the compressor installation 10 has a circulation or cooling circuit 26, in which cooling water 25 free of oil and lubricants circulates as the coolant Thus, the compression occurs as in a polytropic process with a polytropic exponent between 0.95 and 1.05, preferably between 0.95 and 1.0. During compression, the cooling water 25 is injected in the area of the screw-type compressor via water injection nozzles and takes up the heat produced during compression in the compressor 12. The injection nozzles, preferably designed according to DE-AS-40 42 177, inject both into the take-in side and the pressure side of the compressor. The injection is effected such that it is made sure that no evaporation occurs anywhere in the compressor. By means of a cooling water distributing device 70, the ratio of the cooling water injected into the take-in duct and the cooling water injected into the compressor housing can be adjusted. In this way, a 100% saturation of the air entering the compressor can be obtained even with varying operational conditions. An early atomizing that results in very fine water droplets and the extended injection with a flat temperature curve for the inside of the compressor, together with the strict tolerances, will effect a particularly high efficiency.

The cooling and condensation water 25 condenses almost entirely in the settling vessel 20. Due to the pressure prevailing in the settling vessel 20, the cooling water is urged towards a water treatment device 31 via a cooling liquid conduit 28, which water treatment device prevents mineral deposits from occurring and which preferably is a polarization means. From the water treatment device 31, the water is urged towards a cooling means 32 and a particulate filter 34 from where the treated and cooled water is led to the water injection nozzles of the compressor 12.

The compressor installation may be filled with supply water though a supply water inlet 36, the supply water being added to the air taken-in through the gas take-in duct 14. The supply water reaches the water treatment device 31 arranged in the course of the coolant line 28 via the compressor 12, the connection conduit 18 and the settling vessel 20.

Figure 2:
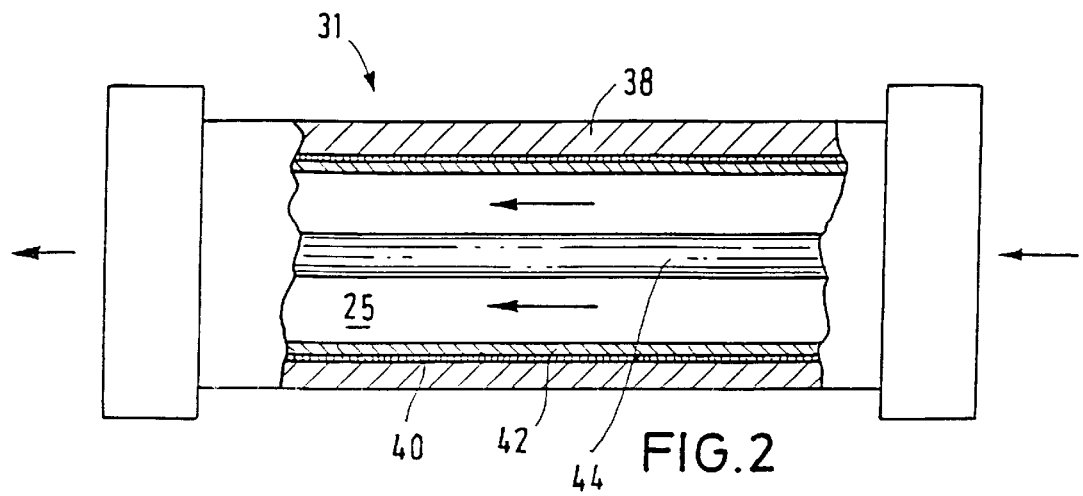
FIG. 2 is an enlarged view of the water treatment device of FIG. 1.

The polarization means used as the water treatment device 31 and shown in an enlarged scale in FIG. 2, has a steel pipe 38 flown through axially and serving as the treatment vessel. The inner side of the steel pipe 38 is provided with an insulation 40 made of plastic material insulating the steel pipe 38 from a metal electrode 42 of aluminum. The counter electrode 44 is a rod shaped carbon electrode provided inside the cylindrical steel pipe 38. The counter electrode 44, the axis of which coincides with the axis of the steel pipe 38, is of the same length as the metal electrode 42 and is electrically connected with the same only through the cooling water 25 flowing through the steel pipe.

When treating the cooling water 25, the element voltage occurring between the metal electrode 42 and the counter electrode 44 is used. As long as water 25 containing minerals is passed through the steel pipe 38 as the electrolyte, the metal electrode 42, the counter electrode 44 and the cooling water 25 containing the minerals constitute a galvanic element. The voltage between the metal electrode 42 and the counter electrode 44 is between 0.8 and 1.2 V depending on the nature of the cooling water 25 and the electrodes 42, 44.

The polarization means 31 that can also be referred to as an ion charger prevents or decomposes precipitations and incrustations of silicon, calcium and magnesium The ionizing achieved inside the ion charger due to the element voltage prevailing between the two electrodes 42, 44 transforms the natural minerals dissolved in the water, e.g., calcium, magnesium, silicon and iron, almost entirely into the corresponding hydroxides (e.g., $Ca(OH)_2$, $Mg(OH)_2$, $Si(OH)_2$, $Fe(OH)_2$). After this transformation, the resulting hydroxide particles take an electric charge. By this condition, in which each particle has the same charge with the same polarity, it is prevented that the particles agglomerate. This is due to like charges repelling each other.

Since the ionized mineral particles will retain their charged condition only for a limited time, it is necessary to continually repeat the ionizing of the cooling water 25. In the preferred embodiment, the cooling water 25 is passed through the water treatment device 31 about 6 times per minute. Due to the repeated treatment of the cooling water 25 in the water treatment device 31 that is possible because of the cooling water return, a sufficient electric charging of the foreign matter and thus a softening of the cooling water 25 can be achieved even with the comparatively weak electrical field.

It is important for the function of the water treatment device 31 that the aluminum electrode is connected with the carbon electrode 44 only via the cooling water 25 so that no current flows between the electrodes 42, 44, except for the charge transport Were the two electrodes 42, 44 connected electrically, large amounts of aluminum could be released, having the negative consequence that the silicon dissolved in the cooling water 25 would precipitate and form persistent deposits on shafts, housings and axial face seals.

The particulate filter 34 arranged downstream of the water treatment device 31 serves to permanently clean the cooling water 25 from foreign matter. Since the membrane of the particulate filter 34 may become clogged, the particulate filter 34 should be replaced regularly.

In order to guarantee an operation of the compressor installation 10 with little maintenance required, an electric control is provided that has a central unit 46 and upper and lower level sensors 48, 49. It is the purpose of the level sensors 48, 49 to monitor the cooling water level in the settling vessel 20. Depending on the temperature and the humidity of the air taken-in, more or less condensation water is introduced to the cooling circuit 26.

When the air to be compressed is warm and highly humid, the compression causes the generation of particularly much condensation water. This is automatically drained from the cooling circuit 26 by means of a drain pipe 50. To this effect, the central unit 46 automatically opens a drain valve 52, when the cooling water 25 in the settling vessel 20 reaches the maximum tolerable water level, which is signaled by the upper level sensor 48. When the lower level sensor 49 is reached, the drain valve 52 closes.

Although a preferred embodiment of the invention has been specifically illustrated and described herein, it is to be understood that minor variations may be made in the apparatus without departing from the spirit and scope of the invention, as defined the appended claims.

I claim:

1. A compressor installation comprising a water-injection cooled compressor (12) having its pressure outlet connected by a connection duct (18) to a settling vessel (20) for separating the injected cooling water (25), the settling vessel (20) being a pressure container connected to the outlet of the compressor (12) in a pressure-tight manner, the compressor installation further comprising a cooling water conduit (28) leading from the settling vessel (20) to the compressor (12), a cooling means (32) arranged in the flow path of the cooling water (25) between the settling vessel (20) and the compressor (12), oil-free cooling water (25) circulating in the circulation circuit (26) formed by the compressor (12), the connection duct (18), the settling vessel (20), the cooling means (32) and the cooling conduit (28), the cooling water being urged towards the cooling means (32) by the pressure prevailing in the settling vessel (20), a water treatment device (31) for preventing mineral deposits is arranged in the circulation circuit (26), the cooling water contained in the circulation circuit being free of additives, means (70) for adjustably controlling the injection of cooling water into the compressor (12) to effect substantially isothermal compression, and the water treatment device (31) being a polarization means for electrically charging foreign matter transported in the cooling water (25).

2. The compressor installation of claim 1, characterized in that the water treatment device (31) comprises a particulate filter (34) that is arranged downstream of the polarization means.

3. The compressor installation of claim 1, characterized in that the cooling means (32) is designed such that the cooling water (25) is fed to the compressor (12) in such quantities and with a temperature low enough for the gas outlet temperature being less than or equal to the gas inlet temperature.

4. The compressor installation of claim 1, characterized in that said polarization means comprises an electrochemical element having a positive and a negative electrode between which the cooling water (25) flows as the electrolyte.

5. The compressor installation of claim 4, characterized in that said polarization means is arranged in a pipe (38) that is flown through axially and has its inner wall provided with a metal electrode (42) cooperating with a counter electrode (44) extending inside the pipe (38).

6. The compressor installation of claim 5, characterized in that the metal electrode (42) is tubular, the counter electrode (44) is rod shaped, both have the same length and that both are connected only through the electrolyte.

7. The compressor installation of claim 1, characterized in that said adjustably controlling injection means (70) is provided in an air take-in duct of the compressor (12), through which means cooling water (25) may be injected in such quantities that the air taken in is entirety saturated upon entering the compressor (12).

8. The compressor installation of claim 7 characterized in that said adjustably controlling injection means (70) includes a cooling water distributing device by which the ratio of the cooling water injected into an air take-in duct to the cooling water injected through a compressor housing may be adjusted.

9. The compressor installation of claim 1, characterized in that injection nozzles are arranged in the compressor housing through which cooling water (25) is injected into a take-in portion and a compression portion of the compressor (12).

10. The compressor installation of claim 9 characterized in that said adjustably controlling injection means (70) includes a cooling water distributing device by which the ratio of the cooling water injected into an air take-in duct to the cooling water injected through a compressor housing may be adjusted.

* * * * *